Aug. 10, 1954

A. W. GAIR 2,686,087

SHAFT BEARING HANGER

Filed June 2, 1951

Inventor:
Albert W. Gair
by Hill, Sherman, Meroni, Gross & Simpson Attys

Patented Aug. 10, 1954

2,686,087

UNITED STATES PATENT OFFICE 2,686,087

SHAFT BEARING HANGER

Albert W. Gair, Fraser, Mich., assignor to Thompson Products, Inc., Cleveland, Ohio, a corporation of Ohio Application June 2, 1951, Serial No. 229,579

8 Claims. (Cl. 308—28)

This invention relates to an improved shaft bearing hanger and more particularly to an improved and simplified trunnion type hanger assembly for resiliently and rotatably mounting a propeller shaft on a vehicle.

The improved shaft mounting or hanger assemblies of the present invention are generally used on motor vehicles which require a propeller shaft made up of two or more sections. The hanger is utilized for supporting the propeller shaft from the vehicle frame at or adjacent the junction point of the shaft sections.

In supporting the vehicle propeller shaft from the frame a resilient mounting is desirable for reducing or eliminating vibration and noise, for providing a self-adjusting alignment between the shaft and the vehicle frame to eliminate uneven bearing load and for allowing a small amount of axial or fore-and-aft movement occurring when the vehicle engine moves on its rubber mounts.

According to this invention, a portion of a vehicle propeller shaft is fixedly secured in the inner race of an anti-friction bearing with the outer face of the bearing secured in a bore of a shaft bearing hanger housing. Means are provided for introducing lubricant into the housing bore and sealing means are disposed at each end of the bore to prevent the egress of lubricant and the ingress of dirt and the like. Dirt shields are provided at each end of the housing bore outwardly of the seals. A pair of oppositely extending trunnion mounts or bosses are formed integrally on the housing and have aligned apertures or recesses formed therein receiving resiliently yieldable pre-loaded bushings in substantially conforming relation. The hanger is suspended in a flanged aperture formed in a cross frame member by means of a pair of cantilever brackets with the free ends received in the resilient bushings and with attachment portions fixedly secured to the frame member. Thus, vibration of the shaft will be damped by the resilient bushings and the bearing load will be transmitted to the vehicle frame. In addition, limited fore-and-aft movement of the shaft will be accommodated by the bushings.

It is, therefore, an object of the present invention to provide an improved hanger for resiliently supporting a rotatable shaft.

Another object of the invention is to provide an improved and simplified shaft mounting assembly for substantially eliminating vibration and noise.

A further object of the invention is to provide a superior shaft bearing hanger including a pair of cantilever brackets with free end portions resiliently retained in opposite apertures in a hanger housing.

An additional object of the present invention is to provide resilient means for supporting a propeller shaft from a transverse frame member through an anti-friction bearing to substantially prevent the transfer of vibrations from the hanger to the frame and to allow limited fore-and-aft movement of the shaft.

A specific object of the present invention is to provide a simplified shaft bearing hanger having a housing with a central bore therethrough and a pair of aligned transversely opposite apertures at right angles to the bore with resilient bushings therein for receiving the free ends of a pair of cantilever brackets to resiliently support the housing and including anti-friction bearing means in the bore for rotatably supporting a propeller shaft.

Other objects, features and advantages of the present invention will be apparent from the following detailed description of one preferred embodiment, by way of example only, taken in conjunction with the accompanying drawings.

Figure 1:
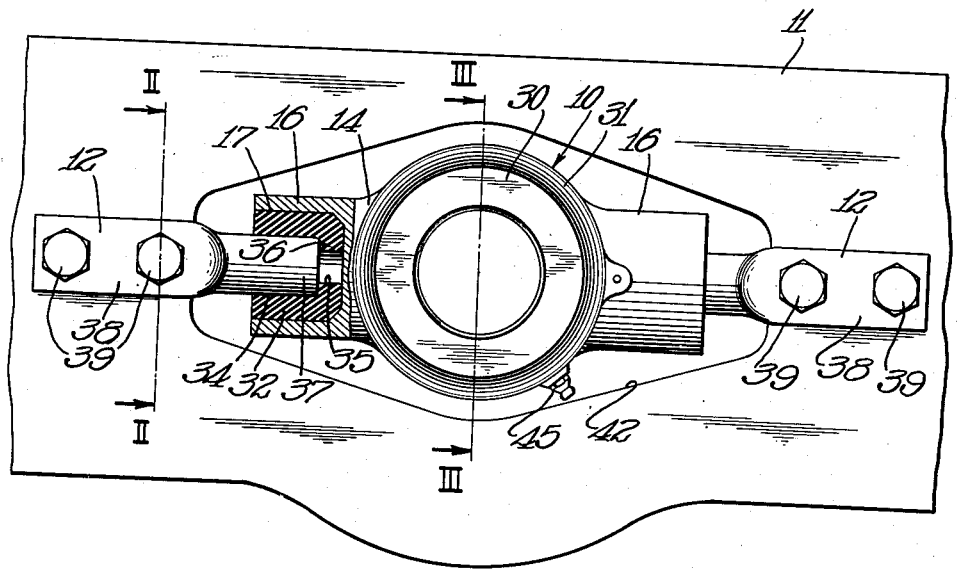
Figure 1 is a fragmentary view of a vehicle cross frame member with a shaft bearing hanger of the present invention secured thereto.
Figure 2:
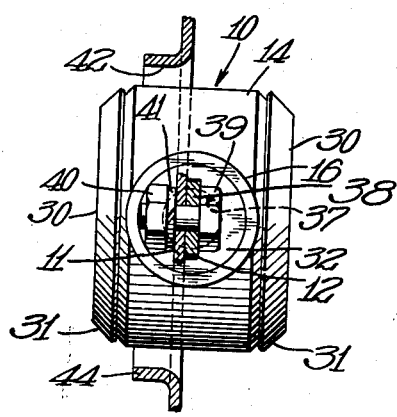
Figure 2 is a fragmentary sectional view, with part of the frame member broken away, taken along line II—II of Figure 1.

In Figure 1 is shown a shaft mounting assembly or a shaft bearing hanger 10 resiliently secured to a vehicle cross frame member 11 by means of a pair of cantilever attachment brackets 12, 12.

Figure 3:
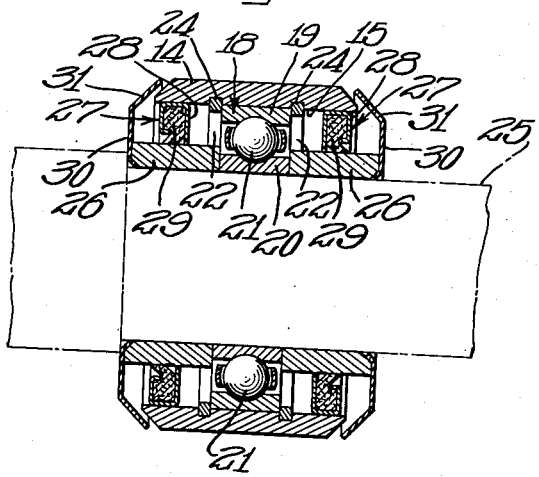
Figure 3 is an enlarged fragmentary sectional view taken along line III—III of Figure 1 and illustrating the bearing arrangement for rotatably securing the hanger to a propeller shaft fragment shown in phantom.

The hanger 10 comprises a housing 14 having a cylindrical central bore 15 therethrough (Fig. 3) and a pair of integral oppositely extending trunnion mounts or bosses 16. The bosses have formed therein cylindrical aligned recesses, the axes of which are at right angles to the bore 15. An anti-friction bearing 18, including an outer race 19, an inner race 20, and a plurality of ball bearings 21, has its outer race secured within the bore 15 by means of a pair of snap rings 22, 22 received in annular grooves 24, 24 formed adjacent the edges of the outer race.

The inner race 20 is disposed over a portion of a rotatable vehicle propeller shaft 25 and is secured thereon by means of a pair of retaining collars 26, 26 which abut opposite edges of the inner race 20 and are, in turn, clamped between the shoulder on the shaft and a flange and nut combination on the shaft (not shown).

A rotatable seal is provided at each end of the bore 15 by means of a pair of sealing rings 27, 27. Each of the sealing rings 27, 27 includes an annular sheet metal backing portion 28 encasing all except the inner edge portion of an annular resilient sealing member 29 formed of resilient sealing material such as rubber, felt, or the like. The backing portions 28 are fixedly secured in the end portions of the bore 15 as by being press fit therein, and the annular inner edge of the sealing portions 29 slidably engage the respective collars 26.

To assist in preventing the ingress of dirt, or the like, into the interior of the bore 15 and to deflect pebbles, stones, and other larger foreign particles, a pair of sheet metal annular protective dirt covers 30, 30 are secured to the outer edges of the retaining collars 26 and have inwardly deflected outer flanges 31, 31 closely spaced from the edge of housing 11 about the bore 15.

According to the present invention, means are provided for resiliently connecting the hanger housing 14 to the cross frame member 11 through the attachment brackets 12. Herein such means comprise a pair of resiliently yieldable bushings 32, 32, of rubber or the like, received in the housing recesses 17 in substantially conforming relation therein. Each of the bushings 32 includes a cylindrical support chamber 34 and a short reduced diameter inner end hole 35 defined by an annular abutment flange 36. A cylindrical free end stud portion 37 of each of the brackets 12 is received in conforming relation in the support chamber 34 with the inner end of the stud abutting the annular flange 36. When assembled in the recesses with the stud portions inserted therein, the bushings 32 are compressed or pre-loaded so that any pivoting of the housing is accommodated by shear or torsional twist in the bushings.

For fixedly securing the attachment bracket 12 to the cross frame member 11 outer attachment portions 38 of the brackets are secured to the frame member by pin means such as bolts 39 together with nuts 40 and lockwashers 41.

In order to prevent direct contact between hanger housing 14 and the cross frame member 11, a flanged aperture 42, of the same general shape as the housing 14, is formed through the frame member and has a continuous reinforcing flange 44 spaced from the housing.

In order to permit the introduction of lubricant into the interior of the housing bore 15 for lubricating the anti-friction bearing 16, a lubricant fitting 45 is inserted through an aperture (not shown) in the side wall of the bore and forms a lubricant passage thereinto.

From the preceding description it will be readily understood that the present invention provides an improved and simplified shaft bearing hanger including a central portion having a bore therethrough with an anti-friction bearing secured therein and a pair of transversely oppositely extending bosses with aligned apertures therein at right angles to the bore. Resilient bushings are disposed in the aligned apertures and receive the free end portions of the cantilever brackets which are affixed to the cross frame member of a vehicle so that the hanger is resiliently supported with respect to the frame member. A vehicle propeller shaft is rotatably mounted through the inner race of the anti-friction bearing. The resulting assembly reduces or eliminates vibration and noise generated by the propeller shaft and provides for self-alignment of the shaft with respect to the vehicle frame to eliminate undesirable bearing loads. In addition, a small amount of fore-and-aft movement of the shaft is permitted to accommodate movement of the vehicle engine on its rubber mounts.

It will be understood that modifications and variations may be effected without departing from the scope of the novel concepts of the present invention.

I claim as my invention:

1. A hanger for resiliently and rotatably mounting a propeller shaft through an apertured cross frame member of a vehicle, comprising a housing having a central bore therethrough and a pair of integral oppositely extending bosses with aligned recesses therein at right angles to said bore, a pre-loaded resiliently yieldable bushing in each of said recesses, a pair of attachment brackets including flattened attachment portions and cylindrical stud portions with the stud portions retained in said bushings, means fixedly securing said attachment portions to the cross frame member to resiliently suspend said housing in spaced relation to the defining edges of the frame member aperture, an anti-friction bearing including an inner race and an outer race, means retaining the outer race of said bearing in said housing bore, and means for retaining the inner race of said bearing about said propeller shaft to rotatably support the shaft in the housing.

2. In a vehicle having a rotatable propeller shaft, a hanger for resiliently and rotatably securing the shaft from a cross frame member, comprising a housing having a central bore therethrough and a pair of oppositely extending bosses with aligned recesses therein at right angles to the bore, an annular resiliently yieldable bushing disposed in substantially conforming relation in each of said recesses and having a cylindrical support chamber with an annular abutment flange defining a reduced diameter hole at the inner end thereof, a pair of attachment brackets having attachment portions fixedly secured to the cross frame member and inwardly extending cylindrical portions in conforming relation in said bushing support chambers, the inner ends of said cylindrical portions abutting said bushing flanges, and a bearing in said housing bore and about the propeller shaft to rotatably support the shaft in the housing.

3. A hanger for resiliently and rotatably mounting a propeller shaft through a cross frame member of a vehicle, comprising a housing having a central bore therethrough and a pair of integral oppositely extending bosses with aligned recesses therein at right angles to said bore, a resiliently yieldable bushing in each of said recesses, a pair of attachment brackets including attachment portions and stud portions with the stud portions retained in said bushings, means fixedly securing said attachment portions to the cross frame member, and a bearing retained in said housing bore for rotatably supporting the shaft in said housing.

4. A hanger for resiliently and rotatably mounting a propeller shaft through an apertured cross frame member of a vehicle, comprising a housing having a central bore therethrough and oppositely extending bosses with recesses therein at right angles to said bore, a resilient bushing in each of said recesses, a plurality of attachment brackets having stud portions retained in said bushings, means fixedly securing said brackets to the cross frame member to resiliently suspend said housing in spaced relation to the defining edges of the frame member aperture, and a bearing retained in said housing bore and having a portion for receiving the propeller shaft to rotatably support the shaft in said housing.

5. In a vehicle having a rotatable propeller shaft, a hanger for resiliently and rotatably supporting the shaft from a frame member, comprising a housing having a bore therethrough and a plurality of recesses at right angles to the bore, a resilient bushing in each of said recesses, a plurality of cantilever elements having flattened portions fixedly secured to the frame member and having cylindrical free end portions disposed in said bushings to resiliently support said housing on the frame member, and bearing means in said housing bore for rotatably supporting the propeller shaft extending therethrough.

6. In a vehicle having a rotatable propeller shaft, a hanger for resiliently and rotatably securing the shaft from a cross frame member, comprising a housing for freely receiving the shaft, bearing means for rotatably securing the shaft in said housing, said housing having a pair of aligned recesses therein at right angles to the shaft, an annular resilient bushing disposed in substantially conforming relation in each of said apertures and having a cylindrical support chamber with an annular abutment flange defining a reduced diameter hole at the inner end thereof, and a pair of attachment brackets having attachment portions fixedly secured to the cross frame member and inwardly extending cylindrical portions disposed within and in conforming relation to said bushing support chamber, the inner ends of said cylindrical portions abutting said bushing flanges.

7. In a vehicle having a rotatable propeller shaft passing through a cross frame member, a hanger for resiliently and rotatably supporting the shaft within the frame member, comprising a housing having a bore therethrough and a plurality of recesses at right angles to the bore, a resilient bushing in each of said recesses providing resiliency both axially and laterally of said recesses, a plurality of support elements secured to the frame member in the horizontal plane of the shaft and having portions disposed in said bushings to universally resiliently support said housing on the frame member, and bearing means for rotatably securing said propeller shaft in said housing bore.

8. A hanger for resiliently and rotatably supporting a shaft within a stationary member, comprising a housing for the shaft, bearing means for rotatably mounting the shaft in said housing, a plurality of resilient bushings secured to said housing with their axes extending transversely of said shaft and passing therethrough, and a plurality of support elements adapted to be secured to the stationary member at points lying substantially in the horizontal plane of said shaft and having stud portions disposed in said bushings to resiliently support said housing.

References Cited in the file of this patent

UNITED STATES PATENTS

| Number | Name | Date |
|---|---|---|
| 6,464 | Bancroft | May 22, 1849 |
| 429,723 | Hemenway | June 10, 1890 |
| 1,093,822 | Blum | Apr. 21, 1914 |
| 2,450,279 | Guy | Sept. 28, 1948 |